Patented May 14, 1940

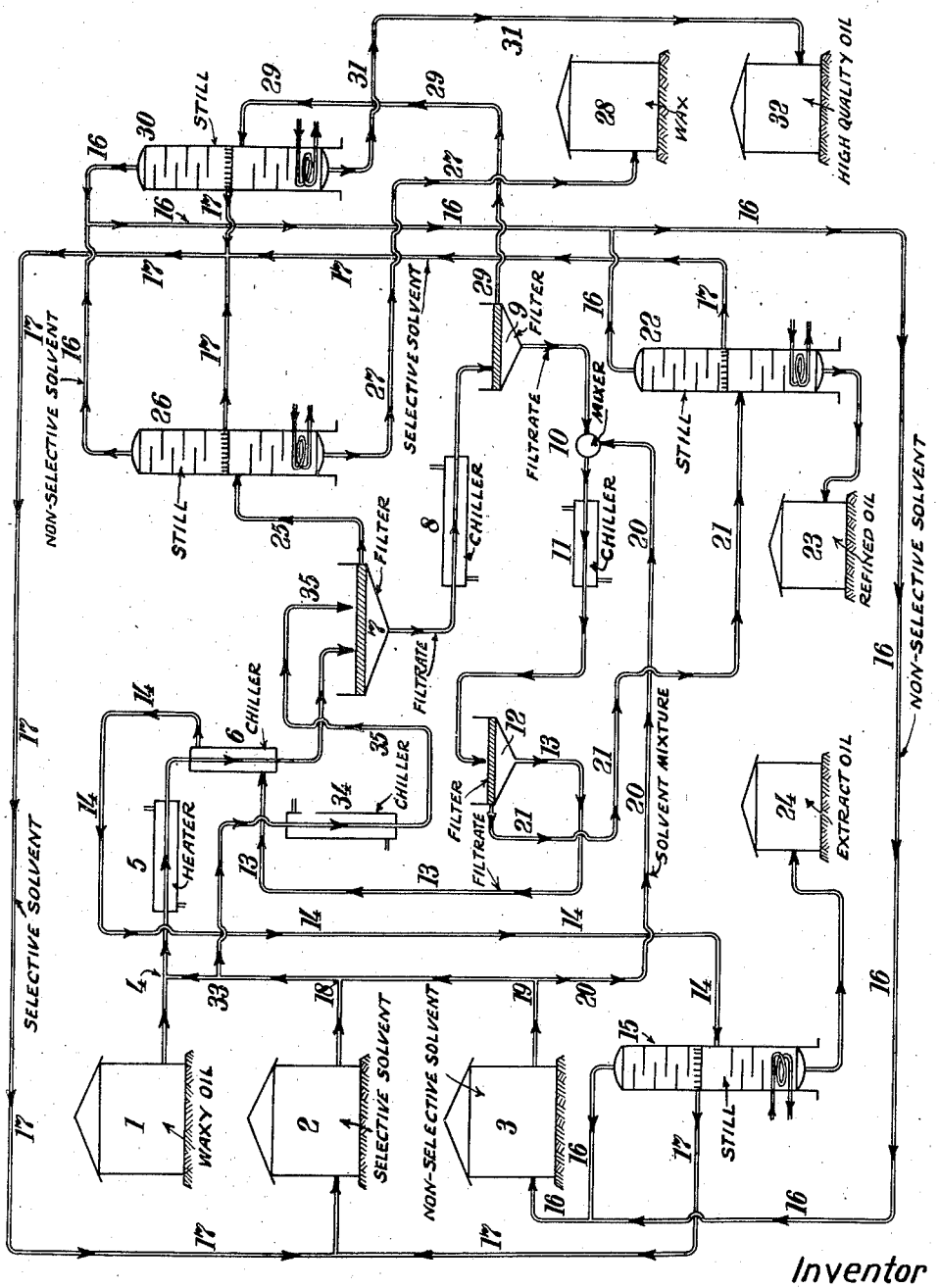

2,201,120

UNITED STATES PATENT OFFICE 2,201,120

PROCESS FOR SEPARATING HYDROCARBON OILS

Ernst Bösing, Berlin, Germany, assignor to Edeleanu Gesellschaft, m. b. H., a corporation of Germany Application August 17, 1938, Serial No. 225,463
In Germany August 31, 1937

9 Claims. (Cl. 196—13)

This invention relates to the separation of hydrocarbon mixtures such as crude oils, residual oils and distillates derived therefrom. More specifically, the invention relates to a process in which unrefined hydrocarbon oils are cooled in the presence of active diluents to such a low temperature, e. g. −15° F. or lower, that the high viscosity constituents, which are valuable for lubricating purposes and which are contained in said hydrocarbon oils, are separated in a readily filterable form.

It is already known to dissolve wax-containing hydrocarbon oils in such diluents as low boiling hydrocarbons, ethers or others, and to cool the solution to a low temperature in order to precipitate and remove the wax therefrom. It has also been proposed to use in similar processes mixtures or blends of solvents, of which one solvent is selective towards certain groups of oil constituents and the other solvent is non-selective, that is, one which exerts no selective solvent action on any group of hydrocarbon oil constituents. The composition and proportions of such solvent mixtures or blends, as disclosed for this purpose in the prior art, are however, always selected in such manner that their components are miscible even at very low temperatures in one liquid phase, and a separation of the oil-solvent mixture into two phases is carefully avoided.

I have discovered that, in contradistinction to the known practice, a solvent blend may be employed to prepare the oil-solvent mixture for separation into high and low quality fractions, which solvent blend comprises both a selective solvent and a non-selective solvent and in which part of the non-selective solvent solidifies at the low temperature of treatment and assists in the removal of the high quality oil constituents from the mixture, i. e., acts as a separation aid. Benzol $C_6H_6$, for example, is such a suitable non-selective solvent. It will be understood that my invention also comprises the treatment of wax containing oils, in which case the wax separates out in the cooled oil-solvent mixture, along with some of the benzol, and both wax and benzol function as separation aid for the high quality oil.

It is already known in the art of dewaxing hydrocarbon oils to employ a blend of a selective solvent, having a low melting point such as acetone, and a non-selective solvent, having a comparatively high melting point such as benzol, to dissolve the wax containing hydrocarbon oil in said solvent blend, cool the mixture to a low temperature and remove the solidified wax therefrom. In these known processes, however, the composition of the solvent blend is always selected in such manner that the normally liquid high quality oil constituents remain homogeneously dissolved and that only the wax, containing a comparatively small amount of liquid oil constituents of relatively high viscosity index, separates out as a solid phase.

The hydrocarbon oil which may be refined according to my invention, may be a crude oil, a residual oil or a distillate derived from mineral oils, coal tar oils, cracked oils or from oils produced synthetically.

In the practice of my invention the hydrocarbon oil to be refined is mixed with a solvent blend, preferably of such composition that at the temperature of mixing, all of the hydrocarbon oil constituents are dissolved, and which can be strongly cooled without becoming viscous. This solvent blend comprises a solvent which exerts a selective solvent action only upon the low quality oil constituents of the hydrocarbon oil and which remains liquid at the low treating temperature; and it comprises a second solvent which is not selective towards any group of hydrocarbon oil components, and which has a melting point so high that it solidifies partly at the low treating temperature.

Examples of selective solvents suitable for carrying out my invention when mixed with one or more non-selective solvents, are liquid sulphur dioxide, pyridine $C_5H_5N$, mixtures of pyridine and its homologs for example $\alpha$, $\beta$, $\gamma$ picolines ($CH_3C_5H_4N$), acetone, fluorine derivatives of low boiling hydrocarbons of the paraffin series, such as difluoromethane $CH_2F_2$, trifluoro-ethane $CHF_2$—$CH_2F$, mixtures thereof, and others.

Representatives of the non-selective solvents which are operative in my process are benzol, dihydronaphthalene and others. 1, 4 dihydronaphthalene has a melting point of 60° F. and a boiling point of 414° F. Generally speaking, any auxiliary solvent which is entirely miscible with the selective solvent as well as with the hydrocarbon oil and which solidifies partly at the filtration temperature, having preferably a melting point of about 30° F. or above, will work for the purpose described.

Instead of using one non-selective solvent of the type described, in mixture with the selective solvent, I may also employ a mixture containing the selective solvent and two non-selective solvents of which one has a comparatively high melting point and the other a comparatively low melting point. A blend of benzol and tetralin (tetrahydronaphthalene) $C_{10}H_{12}$ may be mentioned as an example; benzol has the comparatively high melting point of $+42°$ F. and tetralin solidifies only far below 0° F.

In carrying out my process I dissolve the hydrocarbon oil in a blend of a selective solvent and one or more non-selective solvents, at least one of which has a comparatively high melting point, and thereupon the homogeneous solution, thus obtained, is cooled to a low temperature. The respective quantities of selective and non-selective solvents are chosen in such manner that a phase separation between the high and low quality constituents of the oil is obtained at the low temperature and that part of the non-selective solvent crystallizes out. I have discovered that this crystallized non-selective solvent functions as an adsorption medium for the high quality oil constituents which are being separated out of the solution as an undissolved phase due to the selective action of the solvent blend. The undissolved phase, comprising the high quality oil components and the crystallized non-selective solvent, is separated by settling or preferably by filtration from the dissolved phase containing the low quality oil components dissolved in the bulk of the remaining solvent blend.

When using the filtration method for separating the undissolved phase from the dissolved phase, continuous rotating drum filters may preferably be employed. The undissolved phase is thereby obtained as a filter cake and this cake is readily washed with a diluent blend of the same or similar composition as that remaining in the filtrate solution. In most cases washing of the cake can be eliminated. The cake is removed from the filter and is heated to recover by distillation the diluent or diluents contained therein.

Instead of using the distillation method for solvent recovery, I may employ a solvent for washing the diluents out of the undissolved phase.

As compared with other processes of refining hydrocarbon oils, the invention described herein has the advantage that the non-selective solvent or separation aid may be easily removed from the undissolved phase in the case of treating wax-free oils. Another advantage of the new process is that the selectivity of the solvent blend may be controlled by crystallizing out part of the non-selective solvent. It will be seen that, as larger quantities of the non-selective solvent solidify, the selectivity of the solvent blend remaining liquid increases, until a separation into two liquid phases occurs, one of which contains the high quality oil constituents in admixture with the non-selective solvent crystals.

In the process described herein I prefer to use a solvent blend containing a selective solvent, f. i. $SO_2$, and a non-selective solvent, f. i. benzol, and containing the non-selective solvent in such quantities that a homogeneous solution is just obtained at normal temperature. Upon cooling this homogeneous solution, part of the benzol or other non-selective solvent solidifies and separates out as a solid. Consequently, the remaining liquid solvent mixture becomes more selective, due to the action of the liquid $SO_2$, and the previously homogeneous oil-solvent solution separates into two phases, one of which contains the bulk of the solvent blend and dissolved therein the low quality oil constituents, and the other contains the solid benzol and included therein or commingled therewith the high quality oil constituents or refined oil.

This new process may be carried out in several steps instead of in one, as described, and it may also be combined with other refining methods.

To illustrate my method of operation I refer to the appended flow diagram which shows an operating cycle comprising a normal dewaxing step followed by two oil separation steps.

Tank 1 contains the waxy oil to be processed. Tank 2 serves as storage for the selective solvent and tank 3 contains the non-selective solvent. The oil flows from tank 1 to branch 4 and is diluted with a solvent mixture having one component of the non-selective type towards the oil phase and another component of the selective type. The solvent mixture is so adjusted that during the first filtration step a complete solvent action is exerted upon the normally liquid oil constituents since this step of operation represents a normal dewaxing process. The proper blending of the two solvent components is accomplished at points 18 and 19. The mixture of dewaxing solvent and oil enters heater 5 wherein the fluids are warmed up until a homogeneous solution results. Leaving heater 5 the mixture is cooled in chiller 6 by means of a relatively cold extract-solution whose source of origin will be described later.

In chiller 6 the wax is precipitated from a homogeneous solution of oil and solvent and the cold mass flows into filter 7 wherein wax and oil are separated in a conventional manner. The filter-cake resulting from this operation is washed with solvent of the same composition as the diluent solution. This wash-solvent is branched off from the mixed-solvent line at point 33 to be conducted to solvent cooler 34 and from there on to filter 7 through line 35. Filtration is carried out at conventional dewaxing temperatures, for example from $-10$ to $-20°$ F.

The filtrate solution obtained from this operation is now pumped through a low temperature chiller 8, wherein the solution is cooled to such an extent that a portion of the non-selective solvent constituent solidifies. This enriches the concentration of the selective solvent in the remaining liquid phase, causing thereby precipitation of relatively high quality oil fractions which adhere to the non-selective solvent crystals to form a readily filterable mass of high quality oil fractions and solid solvent as a filter-cake in filter 9. This filter-cake may be washed with a solvent mixture of essentially the same composition as is now in equilibrium with the oil in the filtrate from this operation, but with most of the oils treated the washing step can be eliminated.

The oil-solvent-crystal cake is removed through line 29 to still 30 wherein the solvents are recovered through lines 16 and 17 to flow to their respective storage tanks 3 and 2. Since the solvent crystals also retain a small amount of selective solvent, provisions are made at the column to recover both separately. If, for example, a pyridine type solvent is used as the selective component and benzol as the non-selective constituent, the benzol is recovered at the top of the tower, whereas the pyridine is recovered from a tray as a side cut, i. e. through lines 17. The still bottoms represent the solvent-free finished high-quality oil fractions which flow through line 31 to storage tank 32.

The filter-cake from the first filtration step in filter 7 represents of course a normal wax-cake.

This cake is removed through line 25 to still 26 to recover the solvents as previously described through lines 16 and 17. The solvent-free wax is withdrawn from the bottom through line 27 into storage tank 28.

Continuing the process cycle from filter 9, the filtrate obtained during the oil-separation step in filter 9 comprises a mixture of mixed solvent and oil fractions richer in naphthenic constituents than the original oil since part of the high-quality oil fractions have been removed as previously explained. The residual solvent composition now contained in the solution has changed to such an extent that the selective component dominates since the non-selective solvent was partly removed in filter 9 with the high-quality oil fractions as a filter-cake. It is, therefore, essential to add a new quantum of non-selective solvent to the filtrate solution from filter 9, approximately equal to the amount removed together with the high-quality oil constituents prior to repeating the oil separation step over filter 12. The new quantum of non-selective solvent is obtained from storage over branch 19 through line 20 and is admitted to the filtrate coming from filter 9 at mixer 10. Leaving mixer 10 the mixture is forced through chiller 11 wherein the temperature is again lowered a few degrees for the purpose of precipitating more oil of higher quality together with non-selective solvent crystals, whereupon the cold mass is forced over filter 12 to separate into a solid phase and a liquid phase.

The filtrate contains now oil constituents of relatively naphthenic characteristics and this solution may be batch extracted by means of modification of the solution with water if the solvent solution comprises pyridine and benzol, whereupon a heavy asphaltic extract solution may be obtained on the one hand and a relatively low grade oil fraction on the other hand. This process step of "batch extraction" is optional and is not indicated in the flow diagram since it is apparent from the drawing that the total filtrate from filter 12 is caused to flow through line 13 to chiller 6 to cool a new charge of stock entering dewaxing filter 7. From chiller 6 the fluid is conducted through line 14 to still 15 to recover oil and solvents. The solvent constituents are separately collected and conveyed to their respective storage tanks whereas the naphthenic or extract oil is run to storage tank 24.

The filter-cake produced in filter 12 is composed of non-selective solvent crystals and higher quality oil components as previously described and this cake is separated into components in column 22 to which it is conducted through line 21. Solvents are recovered through lines 16 and 17 and the refined oil flows to storage tank 23.

The drawing shows the process diagrammatically only and, therefore, no auxiliary devices such as valves, pumps, flow meters etc. are indicated.

Example 1

A lubricating oil distillate containing 20% wax and with properties as shown in the table below, was mixed with 200 vol. % of a diluent blend comprising 40 vol. % benzol and 60 vol. % pyridine. The pyridine, which was used in this instance, was a so-called "technical" or "commercial" pyridine boiling substantially up to 293° F. maximum, and containing mainly higher homologs of pyridine. The pyridine was further dried, prior to its use, and its water content was 0.08%.

The oil-diluent mixture was then cooled to −22° F. whereby the wax separated out which could thereupon be removed from the oil-diluent mixture by filtration. The filtrate, that is the oil-solvent mixture, was further cooled to −40° F. but no appreciable formation of solid particles occurred. A separation of solid matter could also not be effected by the addition of small quantities of water; the water caused merely a phase separation as could be observed. Thereupon further quantities of benzol were added to the filtrate, namely 60 vol. % of the amount of benzol first used, and this caused the separation of a crystalline mass at −40° F., which could again be removed from the remaining oil-solvent solution by filtration. The filter rate thereby obtained was extraordinarily high. Upon melting the low temperature filter cake it was found to consist of benzol and light coloured lubricating oil of improved characteristics both of which were separated from each other by distillation.

The filtrate obtained by filtration at the low temperature of −40° F. yielded an oil of low quality.

The following table gives the results obtained, the viscosity index of the original oil, after having been dewaxed in a conventional manner, was determined to be 60 and this value is shown for comparison in brackets in the first column of the following table:

|  | Original oil | Low temp. undis. oil | Low temperature dissolv. oil | Wax |
|---|---|---|---|---|
| Yield weight percent |  | 44 | 26.5 | 29.5 |
| API gravity | 27.7 | 31.5 | 19.4 |  |
| Vis. index | (60) | 100 |  |  |

Example 2

The wax containing lubricating oil distillate used in Example 1, was treated in this case with 250 vol. % of a benzolpyridine blend containing equal volumes of benzol and pyridine. The solution was again cooled to −22° F., freed from the separated wax by filtration and the dewaxed oil solution was then further cooled to −40° F. whereby a separation into two phases occurred and a filterable mass, containing solid benzol and high quality oil constituents, herein called "low temperature raffinate I," was produced. This mass of benzol crystals and low temperature raffinate I was separated from the oil-solvent mixture by filtration. To the remaining solution was then added about as much benzol as was contained in said low temperature raffinate I, and the solution was thereupon further cooled to −53° F. As a consequence of the addition of benzol and of the further reduction of temperature to −53° F. additional amounts of benzol crystallized out and in it lubricating oil constituents were found again. This second crystallization and fractionation product is herein referred to as "low temperature raffinate II"; it was again separated from the solution, and the latter was one more mixed with benzol and cooled to −53° F. A third separation product (low temperature raffinate III) was obtained containing again benzol in crystallized form and commingled therewith an oil, the quality of which was not as good as that obtained with the first and second separation products because with these products (low temperature raffinate I and II) all the high quality lubricating oil had already been removed from the original distillate.

The solvents, including the crystallized benzol, contained in low temperature raffinates I to III, were recovered by distillation; and likewise the wax cake above mentioned and the final low temperature filtrate were freed from the benzol and pyridine contained therein; and a series of products resulted from the entire treatment with yields and characteristics as shown in the appended table:

|  | Original oil | Wax | Low temp. raffs. | | | Low temperature filtrate or extract |
|---|---|---|---|---|---|---|
|  |  |  | I | II | III |  |
| Yield__percent by weight__ | 100 | 21.8 | 23.0 | 32.7 | 3.8 | 18 |
| API Gravity_____ | 27.7 |  | 31.1 | 30.4 | 24.0 | 17.6 |
| Vis. index_____ | 63 |  | 100 | 94 |  |  |

It will be evident from the disclosure of my invention and from the examples that I have devised a process suitable for the separation of high quality oil constituents from a hydrocarbon oil mixture containing the same along with low quality oil constituents, and that my process is suitable for refining wax containing oils as well as wax-free oils.

I do not limit myself to the procedure described in the examples or to any particular solvent proportions or temperatures mentioned therein as they serve only to illustrate my invention. It will be understood that modifications may be made by those skilled in the art without departing from the scope of my invention.

I claim:

1. A process of producing a lubricating oil of high quality from a wax-free hydrocarbon mixture containing the same together with low quality oil constituents, comprising dissolving said mixture in a solvent blend consisting of a selective solvent having a low melting point and a non-selective solvent having a melting point of not less than 30° F., the volumetric composition of said solvent blend being such that upon cooling to a low temperature a substantial amount of the non-selective solvent will crystallize out as a solid and the remainder of said solvent blend will become selective towards the low quality oil constituents, cooling said solution of hydrocarbon mixture and solvent blend to a low temperature to crystallize out part of said non-selective solvent and to form a heterogeneous wax-free mixture comprising an undissolved phase containing solid non-selective solvent and the liquid high quality oil constituents, and a dissolved phase containing the remainder of said solvent blend in liquid form and dissolved therein the low quality oil constituents, separating the undissolved phase from the dissolved phase and recovering the solvents from both phases.

2. A process of separating hydrocarbon mixtures containing high and low quality oil constituents and wax, comprising dissolving said mixture in a solvent blend consisting of a selective solvent having a low melting point and a non-selective solvent having a melting point of not less than 30° F., the volumetric composition of said solvent blend being such that upon cooling to —40° F. or lower a substantial amount of the non-selective solvent will crystallize out as a solid and the remainder of said solvent blend will become selective towards the low quality oil constituents, cooling the solution of said hydrocarbon mixtures in said solvent blend to a temperature of substantially 20° below zero F. whereby only the wax separates out as a solid phase, removing said wax from the solution, cooling the latter to substantially 40° below zero Fahrenheit to crystallize out part of the non-selective solvent and to form an undissolved phase containing solid non-selective solvent and the liquid high quality oil phase, and a dissolved phase containing the remainder of said solvent blend in liquid form and dissolved therein the low quality oil constituents, separating the undissolved phase from the dissolved phase and recovering the solvents from the solid wax phase and from the undissolved and dissolved phases.

3. A process of separating hydrocarbon mixtures containing high and low quality oil constituents and wax, comprising dissolving said mixture in a solvent blend consisting of a selective solvent having a low melting point and a non-selective solvent having a melting point of not less than 30° F., the volumetric composition of said solvent blend being such that upon cooling to —40° F. or lower a substantial amount of the non-selective solvent will crystallize out as a solid and the remainder of said solvent blend will become selective towards the low quality oil constituents, cooling the solution of said hydrocarbon mixtures in said solvent blend to a temperature of substantially —20° F. whereby only the wax separates out as a solid phase, removing said wax from the solution, adding to the latter an additional quantity of said non-selective solvent, cooling the mixture to substantially —40° F. to crystallize out part of the non-selective solvent and to form an undissolved phase containing solid nonselective solvent and the liquid high quality oil phase, and a dissolved phase containing the remainder of said solvent blend in liquid form and dissolved therein the low quality oil constituents, separating the undissolved phase from the dissolved phase and recovering the solvents from the solid wax phase and from the undissolved and dissolved phases.

4. A process of producing a lubricating oil of high quality from wax-free hydrocarbon mixtures containing the same together with low quality oil constituents in accordance with claim 1 in which the selective solvent consists of a substance of the class of pyridine and its homologs and in which the non-selective solvent consists of benzol.

5. A process of separating hydrocarbon mixtures containing high and low quality oil constituents and wax in accordance with claim 2 in which the selective solvent consists of a substance of the class of pyridine and its homologs and in which the non-selective solvent consists of benzol, and the solvent blend contains equal volumes of said substance and of benzol.

6. A process of separating hydrocarbon mixtures containing high and low quality oil constituents and wax, comprising dissolving said mixture in a solvent blend consisting of a selective solvent having a low melting point and a non-selective solvent having a melting point of not less than 30° F., the volumetric composition of said solvent blend being such that upon cooling to —40° F. or lower a substantial amount of the non-selective solvent will crystallize out as a solid and the remainder of said solvent blend will become selective towards the low quality oil constituents, cooling the solution of said hydrocarbon mixtures in said solvent blend to a temperature of substantially —20° F. whereby the wax separates out as a solid phase, removing said wax from the solution, and cooling the latter to substantially —40° F. to crystallize out part of the non-selective solvent and to form an undissolved phase containing solid non-selective solvent and high quality oil constituents, and a dissolved phase containing the remainder of said solvent blend in liquid form and dissolved therein low quality oil constituents, separating the undissolved phase from the dissolved phase, adding to the latter an additional quantity of said non-selective solvent and cooling the mixture to substantially −53° F. to obtain a second undissolved phase containing solid non-selective solvent and high quality oil constituents, and a second dissolved phase containing the remainder of the solvent blend and dissolved therein low quality oil constituents, separating the second undissolved phase from the second dissolved phase and recovering the solvents from the solid wax phase, from the first and second undissolved phases and from the second dissolved phase.

7. A process as claimed in claim 6 in which the selective solvent consists of a substance of the class of pyridine and its homologs and in which the non-selective solvent consists of benzol.

8. A process of separating high quality lubricating oil constituents from a wax-free hydrocarbon mixture containing the same together with low quality oil constituents, comprising mixing said hydrocarbon mixture with a solvent blend consisting of a selective solvent having a low melting point and a non-selective solvent which will partly solidify at the separating temperature, said solvent blend having a selective solvent action for the low quality oil constituents and having substantially no solvent action for the high quality oil constituents at temperatures below zero degrees Fahrenheit, cooling the mixture of said high and low quality oil constituents and said solvent blend to below zero degrees Fahrenheit to produce a heterogeneous wax-free mixture comprising an undissolved phase containing solid non-selective solvent and substantially all of the liquid high quality oil constituents, and a dissolved phase containing the remainder of said solvent blend in liquid form and dissolved therein the low quality oil constituents, separating the undissolved phase from the dissolved phase and recovering the solvents from both phases.

9. A process as claimed in claim 8 in which the selective solvent consists of a substance of the class of pyridine and its homologs and in which the non-selective solvent consists of benzol.

ERNST BÖSING.